(No Model.) 3 Sheets—Sheet 1.
W. GRAHAM.
APPARATUS FOR LOADING OR STACKING LUMBER.
No. 538,413. Patented Apr. 30, 1895.

Witnesses
E. J. Nottingham
G. F. Downing

Inventor
Willie Graham
By H. A. Seymour
Attorney

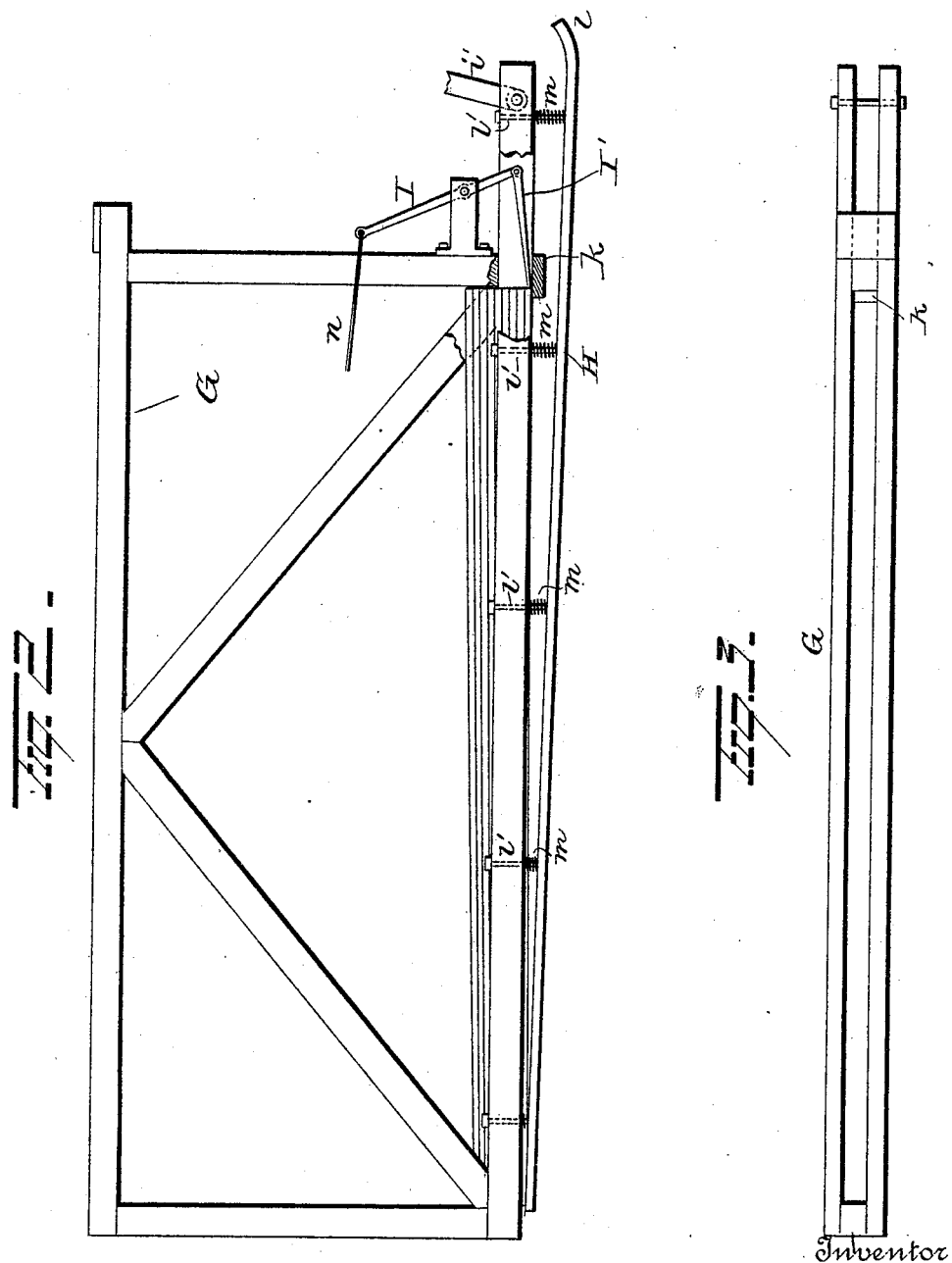

(No Model.) 3 Sheets—Sheet 3.

W. GRAHAM.
APPARATUS FOR LOADING OR STACKING LUMBER.

No. 538,413. Patented Apr. 30, 1895.

Witnesses
G. F. Downing
S. W. Foster

Inventor
W. Graham
By H. A. Seymour
Attorney

UNITED STATES PATENT OFFICE.

WILLIE GRAHAM, OF MERIDIAN, MISSISSIPPI.

APPARATUS FOR LOADING OR STACKING LUMBER.

SPECIFICATION forming part of Letters Patent No. 538,413, dated April 30, 1895.

Application filed November 20, 1894. Serial No. 529,390. (No model.)

*To all whom it may concern:*

Be it known that I, WILLIE GRAHAM, a resident of Meridian, in the county of Lauderdale and State of Mississippi, have invented certain new and useful Improvements in Apparatus for Loading or Stacking Lumber; and I do hereby declare the following to be a full, clear, and exact description of the invention, such as will enable others skilled in the art to which it appertains to make and use the same.

My invention relates to an improvement in apparatus for stacking or loading lumber, the invention being designed more particularly for loading lumber on cars to be run into a drying kiln or apparatus,—the object of the invention being to produce means whereby lumber can be easily and quickly loaded on cars.

A further object is to construct a lumber stacker in such manner that the lumber stacked on the cars of a drying apparatus will be so disposed as to permit a free circulation of air through said lumber during the process of drying.

A further object is to produce an apparatus adapted to stack lumber on cars edgewise and insert spacing sticks between the various tiers of lumber.

A further object is to produce a lumber stacker which shall be simple in construction, easy to control and effectual, in all respects, in the performance of its functions.

With these objects in view the invention consists in certain novel features of construction and combinations and arrangements of parts as hereinafter set forth and pointed out in the claims.

Figure 1:
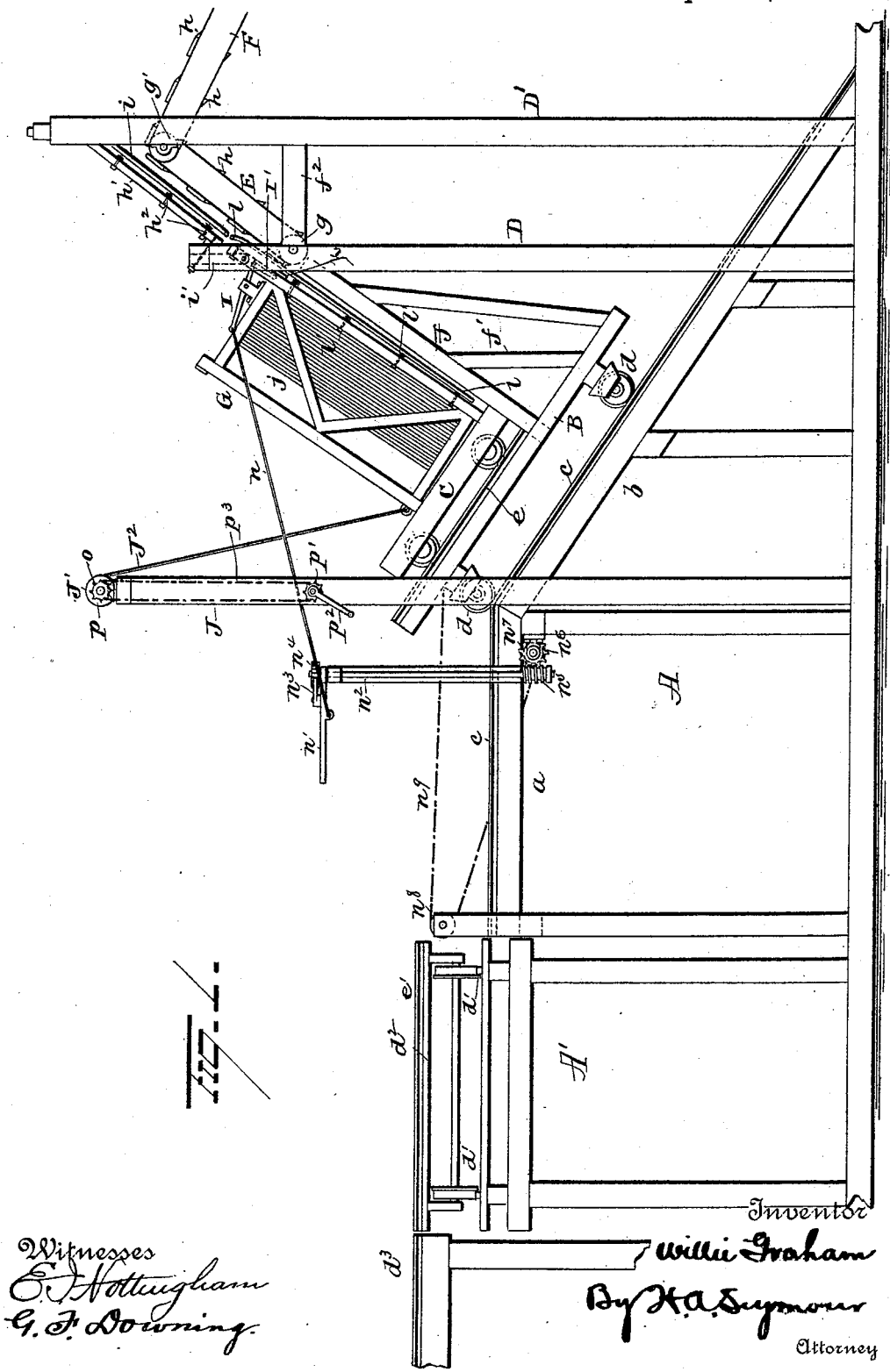
Figure 4:
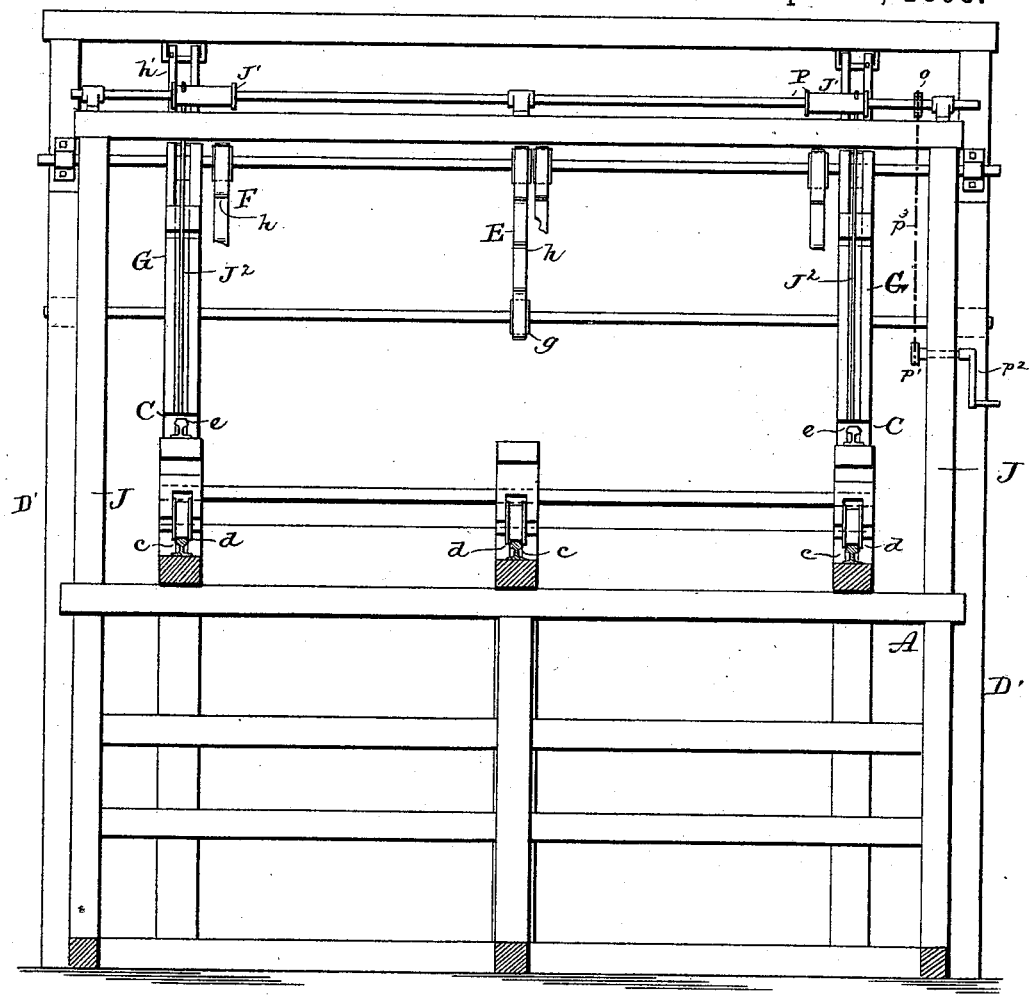

In the accompanying drawings, Figure 1 is an elevation illustrating my improvements. Figs. 2 and 3 are detail views. Fig. 4 is a vertical section showing the upper portion of the machine in elevation.

A represents a framework having a horizontal portion $a$ and an inclined portion $b$ on which tracks $c, c$ are located for the accommodation of a carriage B, the purpose of said carriage being to receive and support the trucks to be loaded with lumber as hereinafter explained and the rear wheels $d$ of this carriage are so located as to be back of the center of gravity of the loaded carriage whereby to prevent the latter from falling over when in an inclined position, in which position it is normally disposed while the trucks thereon are being located. The carriage is provided with tracks $e$ for the accommodation of trucks C, such as are used in lumber drying kilns.

Adjacent to the edge of the horizontal portion of the framework A, a frame or trestle work A' is built and on the latter tracks $d'$ are located for the accommodation of trucks $d^2$, said trucks having tracks $e'$ located transversely thereon and adapted to align with the tracks $e$ on the carriage B when the latter is on the horizontal portion of the framework A so that the loaded trucks C can be run onto the trucks $d^2$ and be conveyed to the drying kiln or building. The trucks $d^2$ need only be used where more than one kiln or building is employed, as the kiln trucks C can be run directly onto tracks $d^3$ supported by timbers extending from the kiln or drying building when only one such kiln or building is employed, in which case said tracks $d^3$ will be made to terminate close to the edge of the framework A. When the transfer trucks $d^2$ are employed, the tracks thereon will be made to align with the tracks $d^3$ so that trucks C can be run over the trucks $d^2$ onto the tracks $d^3$ until one kiln shall have been filled, after which the trucks $d^2$ will be used to convey the filled trucks C to another kiln or building.

When the apparatus is in operation loading a truck C with lumber, the carriage B will be disposed in an inclined position as shown in Fig. 1. Posts or standards $f$ project upwardly from the carriage B preferably slightly in rear of the center thereof, said posts or standards being supported by means of braces $f'$, and against said posts or standards the trucks C being filled are adapted to abut.

A vertical frame D is located to the rear of the framework A, and in advance of the frame D another frame D' is located, said frames being connected together by braces $f^2$. Between the uprights of the frames D, D', drums or sprocket wheels $g, g'$ are located, over which endless carriers E, F, pass, the carrier F also passing over a drum or sprocket wheels located some distance from the main portion of the apparatus,—said carriers being provided with projections $h$ to constitute abutments for lumber being conveyed. Both carriers are disposed in inclined position and, together, form an angle preferably slightly greater than a right angle. The carriers are driven in any suitable manner and adapted to convey the lumber to the trucks C and deposit it thereon edgewise as shown in Fig. 1.

The escape of the lumber by tilting or tipping on the inclined carrier E is prevented by a yielding presser bar $i$ connected with a beam $h'$ secured at its respective ends to the frames D, D', springs $h^2$ being located between said presser bar and beam. A series of plates $i'$ are connected to the tops of the frames D and to the lower ends of said plates a series of frames G adapted to receive spacing sticks, are hinged or pivotally connected, the upper end of said stick frame being normally disposed a short distance from the posts or standards $f$, while the lower ends of said stick frames rest against or in close proximity to said uprights. The sticks $j$ in the stick frame are maintained normally within said frame by means of a stop $k$, and the tier or tiers of lumber on the trucks are prevented from overlapping and are held in proper position by means of a presser bar H (made preferably of pipe) which bears with a yielding pressure against said tier or tiers of lumber. The presser bar is bent (as at $l$) at its upper end to produce a guide to conduct the lumber to the proper position on the trucks C. The presser bar or pipe H is connected with the stick frame by means of a series of pins or bolts $l'$ secured to said presser bar or pipe and passing loosely through a bar of the stick frame, springs $m$ being located on said pins or bolts between said presser bar and stick frame. A lever I is pivoted between its ends to each stick frame, and to the free end of each lever a push bar $I'$ is connected and adapted to be made to engage a stick $j$ and push it out of line with the stop $k$, thus permitting said stick to fall on the lumber on the trucks C so that when another tier of lumber shall have been piled on the trucks a space will be produced between the tiers of lumber for the passage of air when the lumber is in the drying kiln or apparatus. All the levers I are connected by a common shaft and are operated through the medium of a rod $n$ connected with a lever $n'$, which latter is pivotally connected with a shaft $n^2$ extending upwardly from the frame A. The lever $n'$ is provided with a dog $n^3$ adapted to actuate a ratchet device $n^4$ connected with the vertical shaft $n^2$, and the lower end of said shaft is provided with a worm $n^5$ adapted to mesh with and transmit motion to a worm wheel $n^6$ carried by a drum $n^7$ mounted in suitable bearings under the top of the framework A. A chain $n^9$ (or chains) is connected at one end to the carriage B, passes over a pulley $n^8$ at or near the edge of the framework A and at its other end wound on the drum $n^7$. From this construction it will be seen that by vibrating the lever $n$ devices will be operated to discharge the spacing sticks on the last tier of lumber piled on the trucks C and at the same time the drum $n^7$ will be operated to move the carriage B, the manipulation of said lever $n$ during the operation of the apparatus also serving to permit the carriage B to move a limited distance down the inclined portion $b$ of the frame A after a tier of lumber has been piled on the trucks.

When a tier of lumber shall have been piled on the trucks, the lever $n$ will be operated which will cause the levers I to turn on their fulcrums and the push bars $I'$ to push a stick out of line with the stops $k$, permitting said sticks to fall on the tier of lumber. Simultaneously with this operation of the lever $n$, the drum $n^7$ will be permitted to turn and allow the carriage B to move down the incline $b$ so as to bring the trucks C in proper position to receive the next tier of lumber. The operator will then move the lever $n$ back to its normal position, which will cause the push bars to move up and allow another stick to come into position against the stop $k$ in the stick frame. This operation is continued until the trucks C shall have been filled, when the carriage B will be drawn up onto the horizontal portion of the framework A and the loaded trucks C run off and conveyed to the drying kiln. Before the carriage B can be thus moved however, it is necessary to move the stick frames G out of the way. For this purpose the devices now to be explained will be employed. At the top of a vertical frame J a shaft $o$ is mounted and provided with a series of drums $J'$ on which cords or chains $J^2$ are wound, the other ends of said cords or chains being connected with the bottoms of the stick frames G. A sprocket wheel (or pulley) $p$ is secured to the shaft $o$ and another sprocket wheel (or pulley) $p'$ is mounted in the vertical frame J and provided with a crank arm $p^2$. Over these sprocket wheels (or pulleys) a sprocket chain (or strap) $p^3$ passes. From this construction and arrangement of parts it will be seen that when the crank arm $p^2$ is operated the stick frames G will be raised out of the path of the trucks C and the lumber thereon.

Various changes might be made in the details of construction of my invention without departing from the spirit thereof or limiting its scope and hence I do not wish to limit myself to the precise details of construction herein set forth; but Having fully described my invention, what I claim as new, and desire to secure by Letters Patent, is—

1. In a lumber loading apparatus, the combination with a carriage adapted to be disposed in an inclined position, carriers constructed and adapted to deposit lumber on the trucks carried by said carriage in tiers, means for depositing sticks between the tiers of lumber and means for disposing said carriage in a horizontal position to permit the trucks to be run off of the same, substantially as set forth.

2. In a lumber loading apparatus, the combination with a framework having a horizontal and an inclined portion and tracks thereon, of a carriage adapted to run on said tracks, tracks on the carriage to receive trucks to be loaded, means for depositing lumber on the trucks in tiers, means for depositing sticks between the tiers of lumber and means for guiding said lumber to proper position on the trucks and preventing the overlapping of said lumber, substantially as set forth.

3. In a lumber loading apparatus, the combination with a framework having horizontal and inclined portions and tracks thereon, of a carriage adapted to be run on said tracks, means for adjusting the position of the carriage on the inclined portion of the framework and for running it onto the horizontal portion, tracks on the carriage to receive trucks to be loaded, means for loading lumber on the trucks in tiers, means for inserting sticks between the tiers of lumber, and yielding presser bars for guiding the lumber onto the trucks, substantially as set forth.

4. In a lumber loading apparatus, the combination with a carriage adapted to be disposed in a horizontal position and means for loading lumber on the trucks on the carriage in tiers, of a frame pivotally connected to a suitable support and adapted to hold sticks, means for releasing sticks from said frame onto the tiers of lumber, substantially as set forth.

5. In a lumber loading apparatus, the combination with a carriage and means for loading lumber on the trucks on said carriage in tiers, of a stick holding frame, means for releasing sticks from said stick frame onto the tiers of lumber, and means for removing said frame from the path of the loaded trucks, substantially as set forth.

6. In a lumber loading apparatus, the combination with a carriage and means for loading lumber on trucks on said carriage in tiers, of a hinged stick holding frame, means for depositing sticks from said frame onto the tiers of lumber, a vertical frame, a drum mounted in said frame, a crank shaft geared with said drum, and a cord or chain wound on said drum and connected with said stick holding frame, substantially as set forth.

7. In a lumber loading apparatus, the combination with a framework having a horizontal and an inclined portion and tracks thereon, of a carriage adapted to run on said tracks, tracks on said carriage adapted to receive trucks to be loaded, means for loading said trucks with lumber in tiers, a drum, a pulley, a chain wound on said drum passed over the pulley and secured to the carriage, a worm wheel carried by said drum, a shaft, a worm carried by said shaft and meshing with said worm wheel, and a ratchet device connected with said shaft for operating the same to cause a movement of the carriage, substantially as set forth.

8. In a lumber loading apparatus, the combination with a carriage adapted to receive and support trucks to be loaded and means for loading lumber on said trucks in tiers, of a stick holding frame, a stop in said frame for the sticks, a lever, a push bar connected to said lever for pushing a stick out of line with said stop, an operating lever, and a connection between said levers, substantially as set forth.

9. In a lumber loading apparatus, the combination with a carriage, and means for loading lumber on the trucks on said carriage, of a stick frame, means for depositing sticks from said frame onto the tiers of lumber on the trucks, a presser bar connected with said stick frame and adapted to bear against the tiers of lumber on the trucks, and springs between said presser bar and the stick frame, substantially as set forth.

10. The combination with means for receiving lumber thereon, and means for conveying the lumber thereto and discharging it thereon, of a stick carrying frame located in proximity to but movable and adjustable independently of the means for conveying and discharging the lumber, substantially as set forth.

11. The combination with means for receiving lumber thereon, and means for conveying the lumber thereto and discharging it thereon, of a stick carrying frame pivotally supported at its upper end in position to move in a vertical plane above the means for receiving the lumber, substantially as set forth.

In testimony whereof I have signed this specification in the presence of two subscribing witnesses.

WILLIE GRAHAM.

Witnesses:
H. F. BROACH, Jr.,
W. E. BROACH.